United States Patent [19]

Coenen et al.

[11] 4,409,198
[45] Oct. 11, 1983

[54] PROCESS FOR THE PRODUCTION OF COPPER (II) CHLORIDE FROM COPPER (II) OXYCHLORIDE USING TERTIARY AMINE HYDROCHLORIDES

[75] Inventors: Alfred Coenen, Maria Laach; Manfred Schroeder; Guenter Prominski, both of Marl, all of Fed. Rep. of Germany

[73] Assignee: Chemische Werke Huls, AG, Marl, Fed. Rep. of Germany

[21] Appl. No.: 405,009

[22] Filed: Aug. 4, 1982

[30] Foreign Application Priority Data

Aug. 4, 1981 [DE] Fed. Rep. of Germany ....... 3130810

[51] Int. Cl.³ .............................................. C01G 3/05
[52] U.S. Cl. .................................. 423/462; 423/493; 570/241; 570/261; 260/694; 564/497
[58] Field of Search ...................... 423/493, 491, 462; 570/261, 241; 260/694; 564/497

[56] References Cited

U.S. PATENT DOCUMENTS

| | | | |
|---|---|---|---|
| 2,281,879 | 5/1942 | Jayne | 564/497 |
| 3,337,630 | 8/1967 | Moke | 564/497 |
| 3,389,179 | 6/1968 | James | 564/497 |
| 3,470,251 | 9/1969 | Siegart | 564/497 |
| 3,536,593 | 10/1970 | Hurley | 564/497 |
| 3,754,034 | 8/1973 | Crocker | 260/594 |
| 3,821,356 | 6/1974 | Baldwin | 423/491 |
| 3,916,014 | 10/1975 | Nishihara | 260/594 |
| 4,036,776 | 7/1977 | Riegel | 570/241 |
| 4,230,681 | 10/1980 | Coenen | 423/481 |

FOREIGN PATENT DOCUMENTS

| | | | |
|---|---|---|---|
| 13586 | 10/1979 | European Pat. Off. | |
| 2436768 | 5/1980 | France | 570/261 |
| 1054231 | 1/1967 | United Kingdom | 423/491 |
| 1118687 | 7/1968 | United Kingdom | 564/497 |

*Primary Examiner*—Brian E. Hearn
*Attorney, Agent, or Firm*—Millen & White

[57] ABSTRACT

Copper(II) chloride is prepared from copper(II) oxychloride in a nonpolar solvent, preferably during oxychlorination. As the source of hydrogen chloride, the hydrochlorides of certain tertiary amines having 12-40 carbon atoms in total are utilized. The amine contains at most one N-methyl group and its dissociation constant $K_a$ of the equilibrium reaction

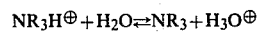

is $10^{-3.5}$ to $10^{-8.5}$. Preferred tertiary amines are a trialkylamine of 15-36 carbon atoms; an N-alkylazacycloalkane of the formula

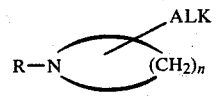

wherein R is alkyl of 6-15 carbon atoms, $5 \leq n \leq 8$, ALK represents one or more alkyl substituents, and the N-alkylazacycloalkane contains at least 15 carbon atoms; or an N,N-dialkylaniline wherein each alkyl group independently contains 6-12 carbon atoms and the benzene ring is optionally substituted by one or more alkyl groups of 1-3 carbon atoms each.

10 Claims, No Drawings

PROCESS FOR THE PRODUCTION OF COPPER (II) CHLORIDE FROM COPPER (II) OXYCHLORIDE USING TERTIARY AMINE HYDROCHLORIDES

BACKGROUND OF THE INVENTION

There are a number of ways to prepare copper(II) chloride (cupric chloride). For example, the anhydrous salt can be obtained by electrolysis of a hydrochloric electrolyte with a copper anode or by chlorination of metallic copper at 400°–500° C. with exclusion of air.

The dihydrate can be prepared, for example, by dual reaction of copper(II) sulfate with sodium chloride in accordance with the process of French Pat. No. 754,184.

Processes using copper(II) oxychloride as starting material are of special interest industrially. This compound is readily available as copper ore and easily accessible from a technical viewpoint. By treating copper(II) oxychloride with aqueous hydrochloric acid, copper(II) chloride is directly obtained.

The reaction of copper(II) oxychloride to copper (II) chloride represents, for example, one step in an overall process involving oxychlorination. The latter process can be divided, for purposes here, into two partial steps. The usual procedure is to chlorinate an organic substrate, e.g., ethylene, using copper(II) chloride (1); oxidizing the resultant copper(I) chloride with atmospheric oxygen to obtain copper(II) oxychloride (2); and finally closing the copper cycle by reacting copper(II) oxychloride with hydrogen chloride to obtain copper(II) chloride (3).

$$2CuCl_2 + CH_2=CH_2 \rightarrow Cl-CH_2-CH_2-Cl + 2CuCl \quad (1)$$

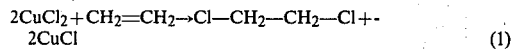

$$2CuCl + \tfrac{1}{2}O_2 \rightarrow Cu_2OCl_2 \quad (2)$$

$$Cu_2OCl_2 + HCl \rightarrow 2CuCl_2 + H_2O \quad (3)$$

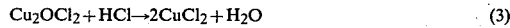

One disadvantage is that high-percentage hydrogen chloride is required in this process. The dilute aqueous hydrochloric acids obtained in many technical processes are unsuitable since, with their use, the resultant copper(II) chloride solution would have evaporated.

Moreover, it is known from European Patent Application 00 13 586 to utilize the hydrochloride of a volatile amine as a hydrogen chloride donor for the synthesis of copper(II) chloride. The amine hydrochloride is converted into the free amine with the aid of air in the presence of copper salts. Simultaneously, a transfer of chloride from hydrogen chloride to the olefin is brought about under the catalytic action of iodine added to the reaction mixture. The process exhibits the following substantial disadvantages:

1. The amine is obtained in the form of a strongly diluted gaseous mixture so that it must first be increased in concentration before reuse.
2. The amine is subject to oxidative decomposition phenomena during the oxidation of the hydrogen chloride and in the presence of iodine.

SUMMARY OF THE INVENTION

Accordingly, it is an object of the present invention to provide a process enabling the use of the amine hydrochlorides obtained in industrial processes for the preparation of copper (II) chloride, without the addition of catalysts, in such a way that it is not only possible to obtain copper(II) chloride, but also to recycle the amine liberated from the amine hydrochlorides without a time-consuming and expensive working-up process and without essential losses.

Upon further study of the specification and appended claims, further objects and advantages of this invention will become apparent to those skilled in the art.

These objects have been attained by providing a process for producing copper(II) chloride from copper(II) oxychloride, preferably during oxychlorination, comprising reacting an aqueous slurry of copper(II) oxychloride
with the hydrochloride of a tertiary amine
in a nonpolar solvent,
wherein the tertiary amine
1. has in total 12–40 carbon atoms,
2. may contain at most one methyl group directly linked to the nitrogen and
3. the dissociation constant $K_a$ of the equilibrium reaction $$NR_3H^+ + H_2O \rightleftharpoons NR_3 + H_3O^+$$

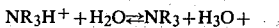

is $10^{-3.5}$ to $10^{-8.5}$.

DETAILED DISCUSSION

The copper(II) oxychloride, also called basic copper(II) chloride, which reacts in the form of a slurry per this invention, is denoted according to IUPAC nomenclature as dicopper chloride trihydroxide. It can be obtained, for example, by air oxidation of copper(I) chloride. Additional methods for its preparation are known from the literature [See G. Brauer, "Handbuch der Präparativen Anorganischen Chemie" [Manual of Preparative Inorganic Chemistry]2:891 (1962), or Kirk-Othmer, Encyclopedia of Chemical Technology, 2nd ed, 6:272 (1965), whose disclosures are incorporated by reference herein.

Various equivalent formulae have been used for this dark yellowish-green powder, insoluble in cold water, of various possible compositions, such as $Cu_2OCl_2$, $CuCl_2.Cu(OH)_2$, $Cu(OH)Cl$, $[3Cu(OH)_2.CuCl_2]$, and $CuCl_2.2CuO.4H_2O$. In the reaction equations used herein, the formula $Cu_2OCl_2$ is employed for the sake of simplicity.

According to this invention, suitable hydrochlorides of tertiary amines have 12–40 carbon atoms and may contain at most one methyl group directly linked to the basic nitrogen. Their dissociation constants $K_a$ of the equilibrium reaction $$NR_3H^\oplus + H_2O \rightleftharpoons NR_3 + H_3O^\oplus$$

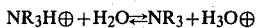

are $10^{-3.5}$ to $10^{-8.5}$, preferably $10^{-4}$ to $10^{-8}$.

The dissociation constant $K_a$ of numerous tertiary amines can be derived from the pertinent literature, for example Handbook of Chemistry and Physics, 57th ed. (1967–1977), pp. D-147 et seq. and other texts, all of whose disclosures are incorporated by reference herein.

The following tertiary amines can be utilized to advantage:

1. Tertiary alkylamines with 3 branched or unbranched aliphatic, e.g., alkyl, side chains and of, in total, preferably 15–36 carbon atoms.
2. N-Alkylazacycloalkanes of the formula

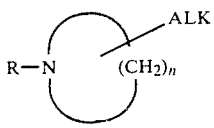

wherein R is an alkyl group of 6–15 carbon atoms and $5 \leq n \leq 8$; the ring can be further alkyl-substituted; and the N-alkylazacycloalkane contains, in total, at least 15 carbon atoms; for example, 1-dodecyl-3,3,5-trimethylazacycloheptane. The details of the alkyl substitution is non-critical as long as the total number of carbon atoms in the amine is within the prescribed range of 12–40. Thus, mono- or polysubstitution in any positions by alkyl groups of any appropriate length is possible.

3. N,N-Dialkylanilines wherein the alkyl groups independently contain 6–12 carbon atoms and the benzene ring can be substituted by 1–3 lower alkyl groups of 1–3 carbon atoms each.

The hydrochlorides of such amines can be, and often are obtained, for example, in the extraction of HCl from dilute hydrochloric acid according to German Pat. No. 2,633,640 whose disclosure is incorporated by reference herein; in the reaction of ammonium chloride with amines to form ammonia and amine hydrochlorides (see DOS 2,940,555, whose disclosure is incorporated by reference herein); as well as in the reaction of sodium chloride, carbonic acid, and amine to form sodium bicarbonate and amine hydrochloride (see DOS 2,940,614, whose disclosure is incorporated by reference herein).

It has been found, surprisingly, that the reaction proceeds as described herein when nonpolar organic compounds such as the hydrocarbons are used as the solvent. Using polar solvents, the yields are substantially smaller.

An organic solvent which is immiscible in water or is hardly water-miscible is required for the reaction of the amine hydrochlorides with the aqueous slurry of copper(II) oxychloride. This solvent must be stable or extensively stable with respect to water, hydrogen chloride, and the amines under the given reaction conditions. Suitable solvents include straight-chain or branched aliphatic (e.g., alkyl) or cycloaliphatic (e.g., cycloalkyl) hydrocarbons of 6–20 carbon atoms, preferably 5–15 carbon atoms, as well as mixtures of such compounds. Especially suitable are hexane, octane, isooctane, decane, dodecane, isododecane, cyclohexane, or isopropylcyclohexane.

The weight ratio of amine hydrochloride to the organic solvent is generally 1:1 to 1:20, preferably from 1:1 to 1:5. The optimum proportion can readily be determined by routine orientation experiments.

In general, the aqueous slurry of copper(II) oxychloride has a weight ratio of water to copper salt in the range from 1:1 to 50:1, preferably 5:1 to 25:1.

The molar ratio of copper(II) salt to amine hydrochloride is usually in the range of 1:3 to 1:15, preferably 1:6 to 1:12, with the copper(II) salt having the formula $[3\ Cu(OH)_2 \cdot CuCl_2]$.

Since the reaction involves in some cases 3 and in many instances even 4 phases not miscible with one another (solid copper(II) oxychloride, aqueous solution, amine hydrochloride, organic solution), intimate blending must be effected, for example by vigorous stirring using conventional means.

In general, the process of this invention is conducted at room temperature (15°–30° C.), but is can be advantageous to have the reaction take place at temperatures of up to 100° C., since the conversion of the amine hydrochloride generally increases with rising temperature. Typical reaction times are ½–2 hours.

In the reaction of the amine hydrochlorides with copper(II) oxychloride, a complete conversion into the free amine is not always achieved; rather, depending on the basicity of the amine component and on the reaction temperature, the reaction leads to an equilibrium. However, it is possible to shift the equilibrium to the side of the free amine by exploiting a substantial advantage of the process of this invention, wherein the usable amine hydrochlorides, although being dissolved in the aforementioned organic solvents at the beginning of the reaction with the slurry of copper(II) oxychloride, are generally displaced therefrom during the formation of free amine, with the creation of a second organic phase. For this purpose, the amine/solvent phase is separated and additional pure solvent is added to the remaining amine hydrochloride. This procedure can be repeated, in principle, until there is no longer the creation of a second organic phase, and the copper (II) chloride has formed in quantitative yield.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(a) Preparation of Copper(II) Oxychloride

An aqueous copper(I) chloride solution is oxidized at 80° C. for 5 hours while passing air through the reaction mixture. As a result, the copper salt, originally present as copper(I) chloride (in accordance with the equation

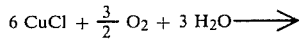

is precipitated as insoluble copper(II) oxychloride. By centrifuging, washing, and drying, the copper(II) oxychloride is isolated.

(b) Reaction of the Tertiary Amine Hydrochloride with Copper (II) Oxychloride 1.85 g (4.33 millimoles) of copper(II) oxychloride of the formula $[3\ Cu(OH)_2 \cdot CuCl_2]$ ($=17.32$ millimoles of Cu ions) is suspended in 25 ml of water and vigorously stirred together with a solution of 10.0 g (25.67 mmol) of tri-2-ethylhexylamine hydrochloride in 40 ml of dodecane for 2 hours at room temperature. After a short period of time, the copper(II) oxychloride has been dissolved in water with the formation of $CuCl_2$. After phase separation, the free amine content in the organic phase and the copper content in the aqueous phase are analyzed. Amine content: 25.5 mmol (9.94 g; 99.3% yield). $Cu^{2+}$ content: 17.0 mmol (98.3% yield).

EXAMPLE 2

3.7 g (8.7 mmol) of copper(II) oxychloride is suspended in 30 ml of water and vigorously stirred for one hour at 20° C. with a solution of 10 g (25.7 mmol) of tri-n-octylamine hydrochloride in 40 ml of dodecane. Allowing the mixture to stand yields two organic phases besides an aqueous one. After separation of the aqueous phase, the organic phases are homogenized by adding 10 ml of toluene for determining the amine conversion. The amine conversion is 45%; just as high is the conversion of $Cu_2OCl_2$ to $CuCl_2$. Repeating the experiment of 50° C. leads to 50%, at 75° C. to 58%, and at 100° C. to 61% conversion. Using hexane as the solvent in place of dodecane, an amine conversion of 50% is obtained at 20° C., while a conversion of 49% is obtained with cyclohexane.

Examples with varying polar solvents are shown in the table below. With the use of these solvents, an organic phase only was formed in all cases.

| Solvent | Yield of Copper(II) Chloride in % |
|---|---|
| Dibutyl ether | 37 |
| Toluene | 25 |
| Isopropanol | 10 |
| Methylene chloride | 8 |
| Nitrobenzene | 6 |
| Ethylhexanol | 6 |
| Propylene carbonate | 6 |
| Benzonitrile | 6 |
| Adipic acid dinitrile | 6 |
| Cyclohexanone | 5 |

EXAMPLE 3

3.7 g (8.66 mmol) of copper(II) oxychloride is suspended in 60 ml of water and stirred in a cylindrical reaction vessel with a solution of 20 g (51.3 mmol) of tri-n-octylamine hydrochloride in 60 ml of hexane at room temperature for one hour. Besides the aqueous phase, two organic phases are formed, the lighter one of which constitutes a solution of tri-n-octylamine (5.37 g; 13.8 mmol) in hexane, while the heavier phase consists predominantly of unreacted tri-n-octylamine hydrochloride. Within 3 hours, 350 ml of hexane is allowed to flow slowly from the bottom into the agitated mixture and simultaneously the hexane/amine phase is continuously withdrawn at the upper part of the rector. During this step, the tri-n-octylamine hydrochloride phase gradually disappears. After the reaction is terminated, the hexane phases are concentrated to one-third their volume, and the content of tri-n-octylamine is determined. Yield: 17.88 g (45.9 mmol) of tri-n-octylamine, corresponding to 89.5%.

EXAMPLE 4

1.85 g (4.3 mmol) of copper(II) oxychloride (=17.3 mmol $Cu^{2+}$) is suspended in 30 ml of water and stirred for one hour at 50° C. with a solution of 11.1 g (25.7 mmol) of triisononylamine hydrochloride in 40 ml of dodecane. After allowing the mixture to stand, two organic phases are formed besides an aqueous one, the top phase consisting predominantly of free amine in dodecane, the lower phase being primarily amine hydrochloride. For an analytical study of the conversion, the two organic phases are homogenized by the addition of 20 ml of toluene, thus finding 5.18 g (13.1 mmol) of triisononylamine; yield: 51.0%. The aqueous phase contains 8.1 mmol $CuCl_2$ in dissolved form.

EXAMPLES 5-14

As described in Example 4, the tertiary amine hydrochlorides listed below are reacted with basic copper chloride [$3 Cu(OH)_2.CuCl_2$]. The conversion of copper(II) oxychloride to copper(II) chloride is indicated. Example 13 was carried out at 75° C., all other examples at 20° C.

| Example | | |
|---|---|---|
| 5 | Tri-n-hexylamine | 39 |
| 6 | Tri-n-decylamine | 45 |
| 7 | Tri-n-dodecylamine | 40 |
| 8 | Tri-2-ethylbutylamine | 91 |
| 9 | N—Octylpiperidine | 20 |
| 10 | N—Octyl-3,3,5-tri-methylcycloazaheptane | 27 |
| 11 | $C_{12}/C_{13}$—Alkyl-3,3,5-trimethylcycloazaheptane | 26 |
| 12 | N,N—Dioctyl-2,6-dimethylaniline | 81 |
| 13 | N,N—Dioctyl-2,6-dimethylaniline | 86 |
| 14 | N,N—Didecylaniline | 96 |

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing copper(II) chloride from copper(II) oxychloride, comprising reacting an aqueous slurry of copper(II) oxychloride with the hydrochloride of a tertiary amine in an organic nonpolar solvent, wherein the tertiary amine has 12-40 carbon atoms in total, contains at most one methyl group directly linked to the nitrogen atom and has a dissociation constant $K_a$ of the equilibrium rection

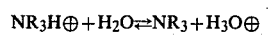

$$NR_3H\oplus + H_2O \rightleftharpoons NR_3 + H_3O\oplus$$

which is $10^{-3.5}$ to $10^{-8.5}$.

2. A process for the production of copper(II) chloride of claim 1, wherein the tertiary amine is a trialkylamine of 15-36 carbon atoms;

an N-alkylazacycloalkane of the formula

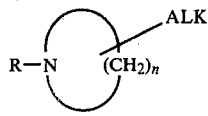

wherein
R is alkyl of 6-15 carbon atoms,
$5 \leq n \leq 8$,
ALK represents one or more alkyl substituents, and
the N-alkylazacycloalkane contains at least 15 carbon atoms in total; or an N,N-dialkylaniline wherein each alkyl group independently contains 6–12 carbon atoms and the benzene ring is optionally substituted by one or more alkyl groups of 1–3 carbon atoms each.

3. A process for the production of copper(II) chloride of claim 1, wherein the nonpolar solvent is a hydrocarbon of 6–20 carbon atoms.

4. A process for the production of copper(II) chloride of claim 1, wherein the nonpolar solvent is a hydrocarbon of 5–15 carbon atoms.

5. A process for the production of copper(II) chloride of claim 3, wherein the solvent is hexane, octane, isooctane, decane, dodecane, isododecane, cyclohexane, or isopropylcyclohexane.

6. A process for the production of copper(II) chloride of claim 1, wherein the weight ratio of water to copper(II) oxychloride is 1:1 to 50:1; the weight ratio of amine hydrochloride to nonpolar organic solvent is 1:1 to 1:20; and the molar ratio of $[3Cu(OH)_2 \cdot CuCl_2]$ to amine hydrochloride is 1:3 to 1:15.

7. A process for the production of copper(II) chloride of claim 1, wherein the weight ratio of water to copper (II) oxychloride is 5:1 to 25:1; the weight ratio of amine hydrochloride to nonpolar organic solvent is 1:1 to 1:5; and the molar ratio of copper(II) oxychloride to amine hydrochloride is 1:6 to 1:12.

8. A process for the production of copper(II) chloride of claim 1, wherein the reaction temperature is 15°–100° C.

9. A process for the production of copper(II) chloride of claim 1, further comprising separating the liquid organic phase which results after the reaction initially reaches substantial equilibrium and which contains the free amine corresponding to the amine hydrochloride; adding additional organic nonpolar solvent to the reaction medium; permitting the resultant reaction medium to again reach substantial equilibrium; and optionally, repeating these steps until the copper(II) oxychloride has been quantitatively reacted.

10. A cyclic oxychlorination process comprising
chlorinating a compound by reaction with $Cu(II)Cl_2$, thereby converting the latter to $Cu(I)Cl$;
reacting the resultant $Cu(I)Cl$ with oxygen to form $Cu_2(II)OCl_2$; and
reacting the latter with the hydrochloride of a tertiary amine in accordance with claim 1 to regenerate $Cu(II)Cl_2$.

* * * * *